May 30, 1933.  C. S. BRAGG ET AL  1,911,425

BRAKE SYSTEM FOR AUTOMOTIVE VEHICLES

Filed June 10, 1930  5 Sheets-Sheet 1

Caleb S. Bragg
Victor W. Kliesrath INVENTORS
BY Louis Prevost Whitaker
ATTORNEY

May 30, 1933.   C. S. BRAGG ET AL   1,911,425
BRAKE SYSTEM FOR AUTOMOTIVE VEHICLES
Filed June 10, 1930   5 Sheets-Sheet 2
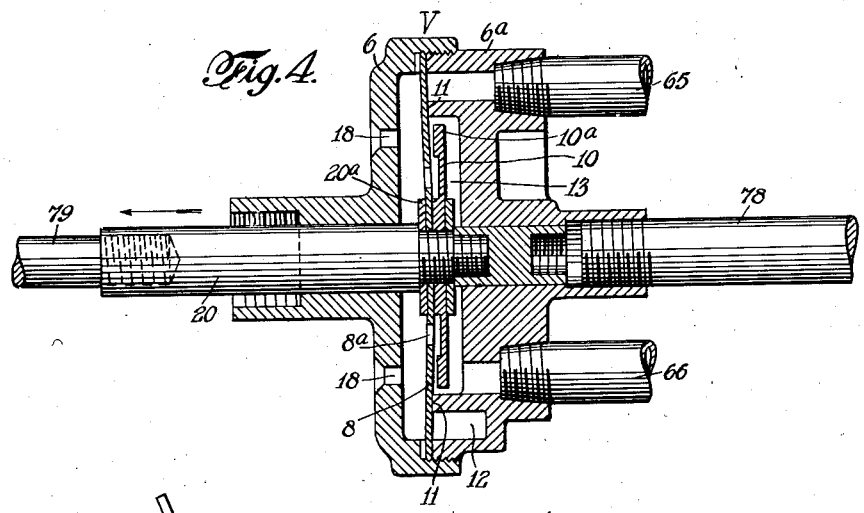
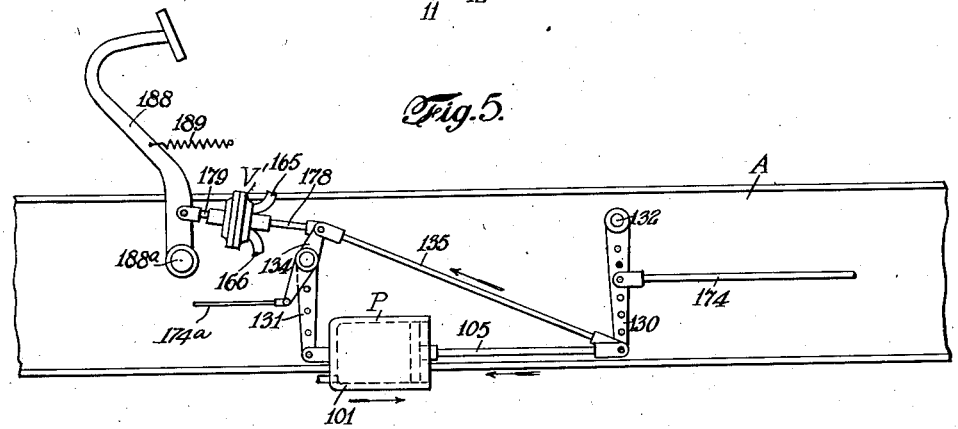
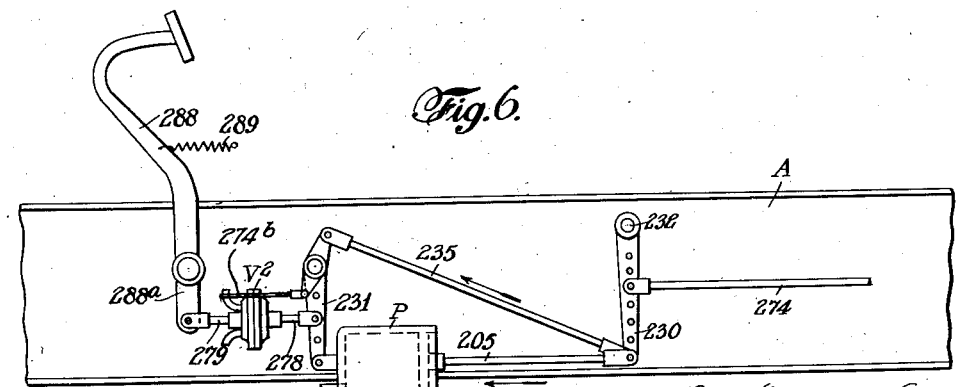

May 30, 1933.  C. S. BRAGG ET AL  1,911,425
BRAKE SYSTEM FOR AUTOMOTIVE VEHICLES
Filed June 10, 1930   5 Sheets-Sheet 3

INVENTORS.
Caleb S. Bragg
Victor W. Kliesrath
BY Louis Prevost Whitaker
ATTORNEY May 30, 1933.  C. S. BRAGG ET AL  1,911,425
BRAKE SYSTEM FOR AUTOMOTIVE VEHICLES
Filed June 10, 1930   5 Sheets-Sheet 4
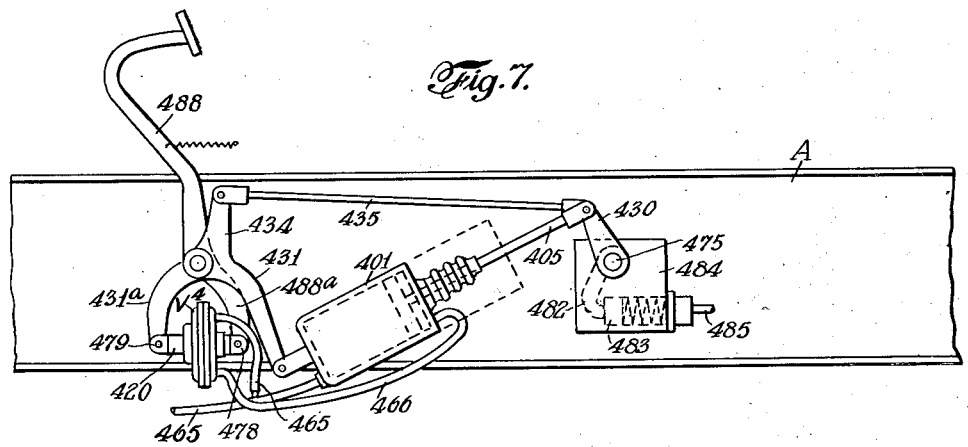
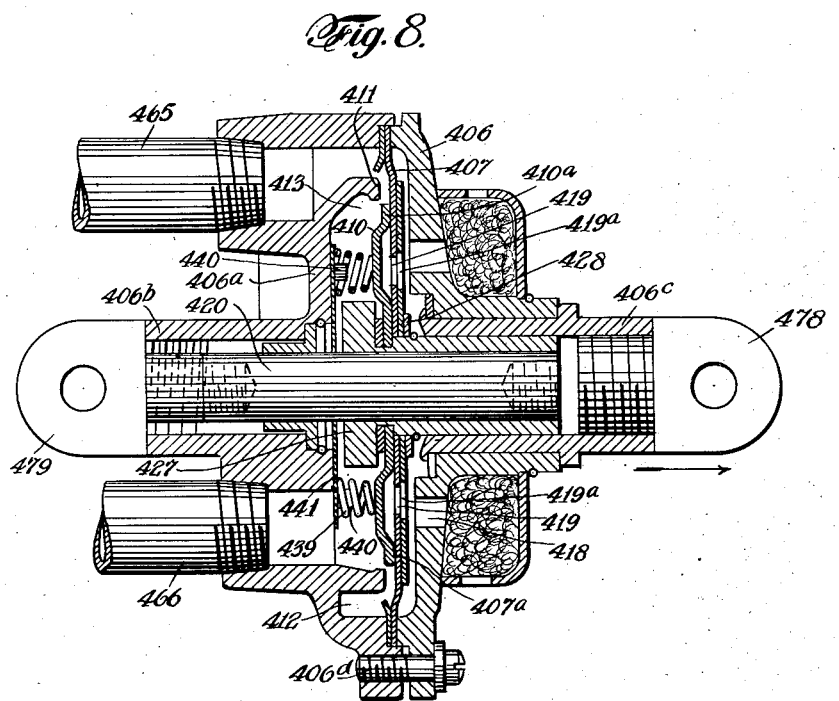

May 30, 1933.  C. S. BRAGG ET AL  1,911,425
BRAKE SYSTEM FOR AUTOMOTIVE VEHICLES
Filed June 10, 1930   5 Sheets-Sheet 5
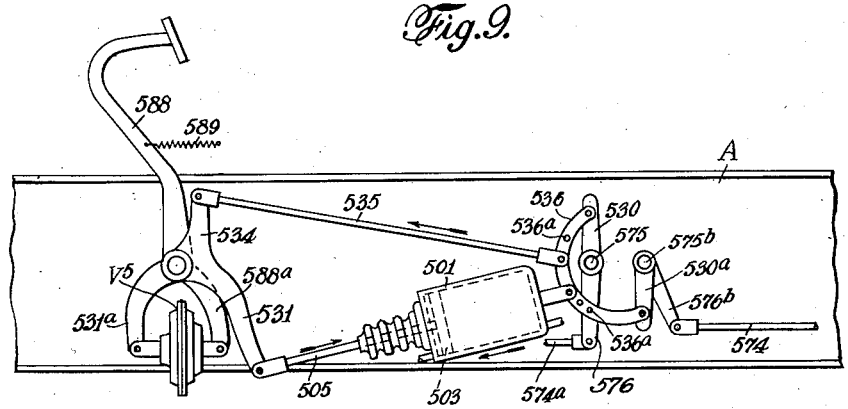
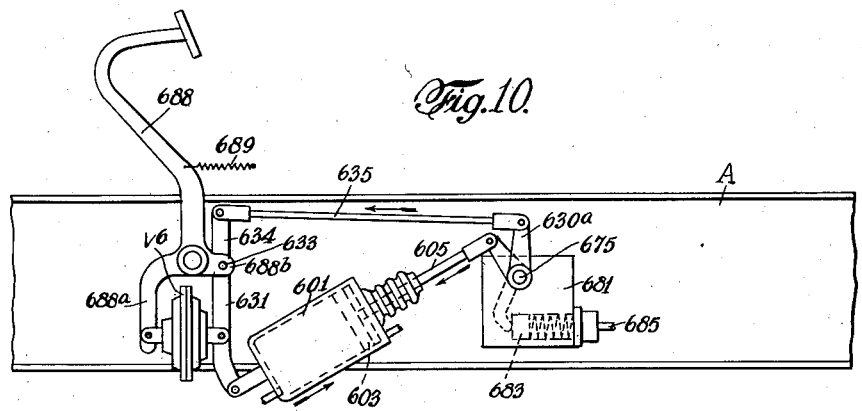
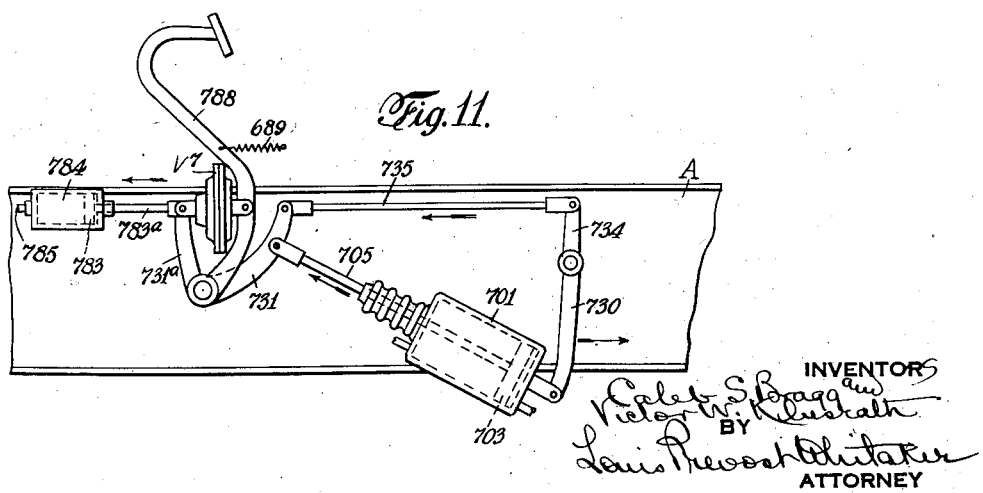

Patented May 30, 1933

1,911,425

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed June 10, 1930. Serial No. 460,134.

Our invention consists in the novel features hereinafter described, reference being had to the accompanying drawings, which illustrate several embodiments of the same, selected by us for purposes of illustration, and the said invention is fully disclosed in the following description and claims.

The tendency of design of modern automotive vehicles, and especially the passenger vehicles, is to lower the center of gravity to a greater and greater extent, and there is consequently less and less clearance between the roadway and the frame or chassis and other parts of the vehicle, and it is furthermore general practice to mount all brake levers in the perpendicular position and to point the levers downwardly so they will not project upwardly above the frame upon which the floor of the vehicle rests. In equipping these vehicles with power brakes, and especially vacuum brakes, it is necessary to employ relatively short levers and a power cylinder of relatively small diameter, to prevent these parts of the brake mechanism from extending closer to the ground than other structural parts of the vehicle. This is especially true of vacuum brakes where vacuum is obtained from the suction passage of the engine where the vacuum rarely exceeds twenty inches of mercury at sea level. Therefore, the ordinary expedients for obtaining any desired amount of power for brake operation, such as the increase in the length of lever or the increase in the diameter of the brake cylinder may not provide the necessary power and road clearance in many instances.

Our present invention consists in an improved brake system for obtaining the necessary power for brake operation in connection with comparatively short levers and with brake cylinder of relatively small diameter which will dispense with the use of brackets with which the larger diameter power actuator cylinders must be attached to the chassis. In carrying our invention into effect we employ two levers pivotally mounted with respect to the vehicle and connected respectively to the cylinder and piston of a fluid pressure power actuator which is supported by and between said levers, both cylinder and piston being preferably movable with respect to the vehicle. One of said levers, which we term for convenience the power amplifying lever, is provided with a power amplifying arm extending on the opposite side of its pivotal support from the main lever arm and connected by a link with the other lever, which we term the power applying lever one of said levers being connected with brake mechanism of the vehicle. The usual brake pedal lever is operatively connected with one of said levers and with the controlling valve mechanism for the power actuator.

By the use of our power amplifying lever, which need be longer than the other lever, which we term the power applying lever, we are able to multiply the power of one of the movable parts of the power actuator and transmit this multiplied power in the same direction to the same point of connection of the other part, although the parts of the power actuator move in opposite directions. Furthermore, as hereinafter described, the cylinder and piston may be supported with their axes in an inclined position where desirable, to reduce the space occupied by the power actuator and the levers.

Our invention comprises the novel features of construction and combination of parts hereinafter described and particularly pointed out in the claims.

Referring to the accompanying drawings which illustrate several embodiments of our invention selected by us for purposes of illustration, Fig. 1 is a diagrammatic representation of an automotive vehicle operated by an internal combustion engine and provided with four wheel mechanical brake mechanisms of non-equalizing type, and embodying our present invention, the actuator shown being of the pressure balanced type.

Fig. 4 is an enlarged sectional view of the controlling valve mechanism illustrated in Fig. 1.

Fig. 5 is a view similar to Fig. 2 showing a slightly modified arrangement of the parts.

Fig. 6 is a similar view showing another slightly modified arrangement of the parts.

Fig. 7 is a similar view of another modification, in which the power amplifying lever is mounted concentrically with the pedal lever, and the power actuator is of the submerged in vacuum, or vacuum-balanced, type, and operatively connected with hydraulic brakes.

Fig. 8 is a detail sectional view of the form of valve mechanism illustrated in Fig. 7.

Fig. 9 is a view similar to Fig. 7 showing equalized mechanical brakes.

Fig. 10 is a view similar to Fig. 7, showing a slight modification.

Fig. 11 is a view illustrating a further modification.

Figure 1:
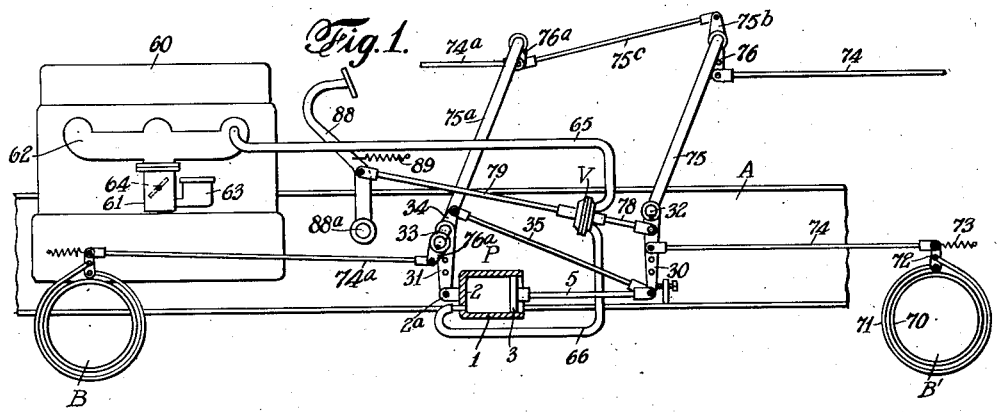
Figure 2:
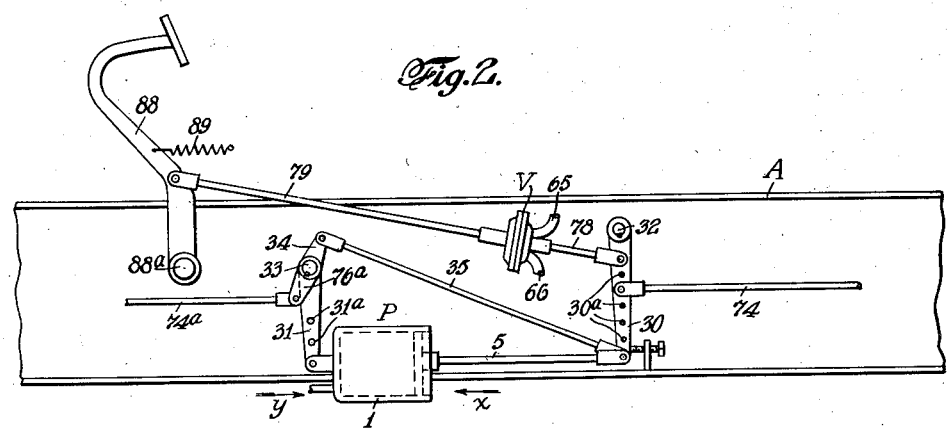
Fig. 2 is an enlarged view of the brake operating mechanism shown in Fig. 1 in the released position.
Figure 3:
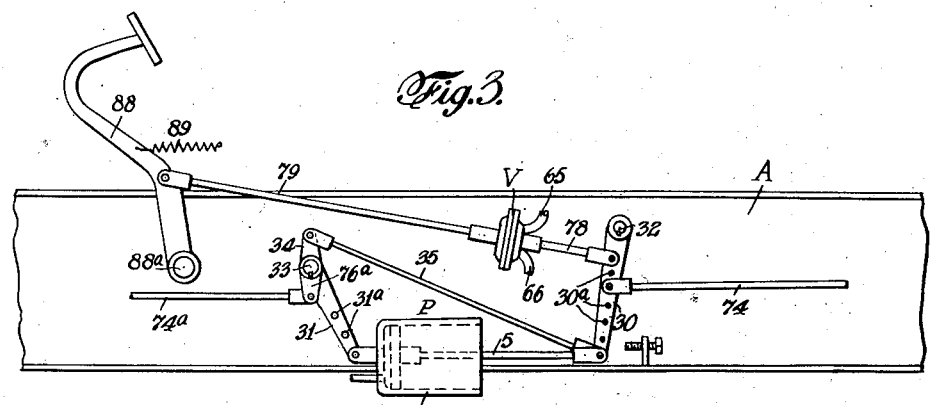
Fig. 3 is a similar view of the same parts in the position which they occupy when the brakes are fully applied.

Referring to the embodiment of our invention shown in Figs. 1, 2, and 3, A represents a portion of the chassis of an automotive vehicle provided with four wheel brake mechanisms, one of the front wheel brake mechanisms being indicated at B, and one of the rear wheel brake mechanisms being indicated at B'. The brake mechanisms may be of any desired type. In the present instance they are shown diagrammatically as comprising each a brake drum, 70, brake band, 71, brake lever, 72, with its retracting spring, 73. The vehicle is provided in this instance with an internal combustion engine, 60, for propelling it in the usual manner. The engine is provided with a suction passage comprising a vertical passage, 61, and intake manifold, 62. 63 represents the carburetor, and 64 the throttle valve. 30 and 31 represent two levers pivotally mounted with respect to the chassis, at 32 and 33, coaxially with the brake shafts, 75 and 75ª, respectively, the lever, 30, being fixed with respect to the shaft, 75, while the lever, 31, is in this instance mounted loosely with respect to the shaft, 75ª, said levers having their lower ends connected respectively with the piston and cylinder of the power actuator, both of which are shown as movable with respect to the chassis. In this instance the power actuator, indicated as a whole at P, is of the pressure balanced type, that is to say, in which all parts of the actuator are subjected to the higher fluid pressure, in this instance, atmospheric pressure, when in the released position. The actuator comprises a cylinder, 1, which is open at one end and closed at the other by a head, 2, the head being provided with a projection, 2ª, pivotally connected to the lever, 31, adjacent to its lower end. 3 represents the piston having a piston rod, 5, which is pivotally connected to the lever, 30, (which is keyed to the brake shaft, 75) adjacent to the lower end of said lever, so that the power actuator is entirely supported by the levers, 30 and 31, and both cylinder and piston of the actuator are movable with respect to each other and with respect to the vehicle. The lever, 31, which for convenience is termed the power amplifying lever, and which is pivotally mounted on the shaft, 75ª, is provided with a power amplifying arm, indicated at 34, which is connected by a positive link 35 with the lever, 30, preferably at the same point at which the piston rod, 5, is connected. Either of the levers, 30 or 31, may be connected with brake mechanisms of the vehicle. In this instance the lever, 30, is connected by a link, 74, with one of the rear wheel brake mechanisms and the rock shaft, 75, to which said lever is rigidly connected by link, 74, with the other rear wheel brake mechanism, not shown. The rock shaft, 75, is shown provided with an arm, 75ᵇ, connected by a link rod, 75ᶜ, with an arm, 76ª, on the rock shaft, 75ª, so as to impart the proper movement in a rotary direction to rock shaft, 75ª, from the rock shaft, 75, and the rock shaft, 75ª, is provided with another arm, 76ª, said arms 76ª being connected by links, 74ª, with the front wheel brake mechanisms, B, one of which is shown in Fig. 1. 88 represents the usual pedal lever, pivoted at 88a, and provided with the usual retracting spring, 89. The pedal lever is preferably connected with either one or the other of the levers, 30, 31, by means providing a sufficient amount of lost motion to secure the operation of the controlling valve mechanism for the actuator to which it is also connected. In practice we find it convenient to employ a valve mechanism, indicated at V, and comprising relatively movable parts located in and supported by the connections between the pedal lever and one of the levers, 30, 31, in this instance the lever, 30. While we do not limit ourselves to any particular type of valve mechanism, we may conveniently use the form of valve mechanism shown in detail in Fig. 4, the specific construction of which forms no part of our present invention, as it is covered by our prior application for Letters Patent of the United States, filed November 7th, 1927, and given Serial No. 231,724. This valve mechanism will, however, be briefly described to facilitate the understanding of the operation of the actuator.

Figure 4A:
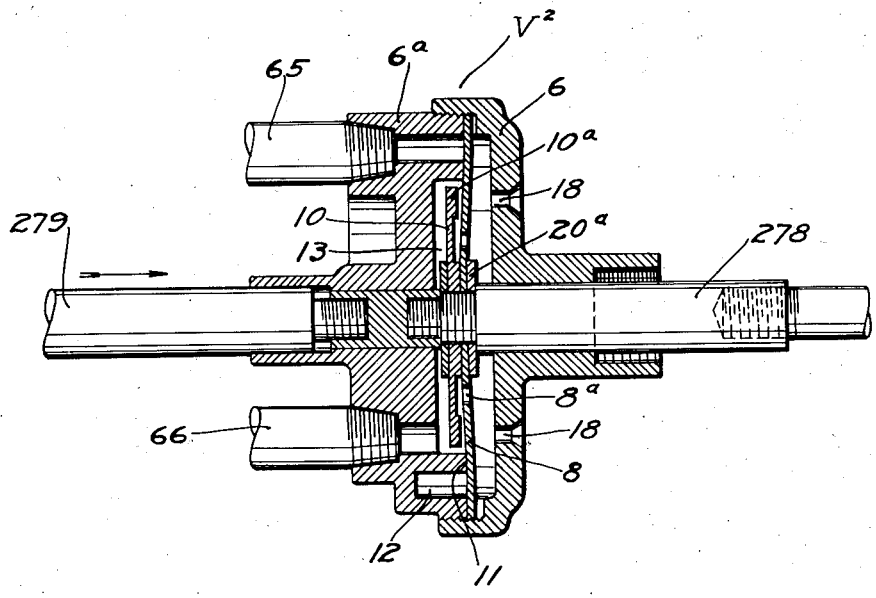
Figure 4a is an enlarged sectional view of a modification of the valve structure disclosed in Figure 4.

As illustrated in Fig. 4, the valve mechanism comprises a casing formed in two parts, 6 and 6a, screwed together and clamping between them the marginal portions of a diaphragm valve, indicated at 8, which in the released position of the parts is seated upon an annular seat, 11, in the casing member, 6a, and is provided with air inlet apertures, 8a, communicating with the atmosphere through apertures, 18, in the casing member, 6. The annular seat, 11, divides the interior of the casing member, 6a, into an annular suction chamber, 12, and a central chamber, 13. 20 represents a valve actuating part extending through a guiding aperture in the valve casing member, 6. The central portion of the diaphragm, 8, is secured to this valve actuating part, which also carries a disc valve, 10, having a seat, 10a, adapted to seat on the diaphragm, but normally held in unseated position when the parts are in released position, as shown in Fig. 4. The valve actuating part, 20, is also provided with means as a collar, 20a, to engage the casing member, 6, and limit the relative movement between the valve means and the valve casing. The valve actuating part is in this instance connected by a link rod, 79, with the pedal lever, and the valve casing member, 6a, is connected by a link rod, 78, with one of the levers, 30, 31, in this instance with the lever, 30. The valve casing is provided with a suction pipe, 65, at least a portion of which is flexible, and said pipe is connected with a source of suction, which is conveniently obtained by connecting the pipe, 65, with the suction passage of the engine between the throttle valve and the engine cylinders. It is shown in Fig. 1 connected with the manifold, 62. The valve casing member, 6a, is also provided with a pipe, 66, at least a portion of which is flexible, communicating with the central chamber, 13, and with the closed end of the actuator cylinder, 1. In the released position of the parts, it will be seen that the diaphragm is seated on the annular seat, 11, cutting off communication between the suction passage and the actuator cylinder, while the interior of the cylinder is maintained in communication with the atmosphere through the apertures in the diaphragm and the apertures in the valve casing member, 6, and pipe 66. It will also be understood that when the operator depresses the foot pedal, 88, the valve actuating part, 20, will be drawn forward, first seating the disc valve, 10, on the diaphragm, so as to cut off the interior of the cylinder from the atmosphere, after which the disc valve will be unseated, thereby placing the interior of the cylinder in communication with the suction pipe, 65. As the air is withdrawn from the interior of the cylinder, there will be a gradually increasing differential of fluid pressures on the opposite faces of the piston, 3, and on the opposite faces of the head, 2, of the cylinder, urging the piston and cylinder head respectively in opposite directions, toward each other. As both of the actuator members are movable, said movable parts provide twice the effective area exposed to the differential of fluid pressures that would be so exposed if either the piston or the cylinder was rigidly connected with the chassis.

It will also be understood that in the type of valve mechanism shown, the opposite faces of the diaphragm and disc valve will be exposed during a power stroke of the actuator to the same differentials of fluid pressure as the members of the power actuator, acting in a direction to resist the forward movement of the pedal lever, and providing a reactionary force depending on the diameter of the valve mechanism and proportionate to the power being exerted by the actuator on the brake mechanism. This reactionary force enables the operator to determine, by the gradually increasing resistance on the sole of his foot, the amount of force being exerted on the brake mechanisms by the actuator. This valve mechanism also provides the usual follow-up feature, in that if the operator stops the forward movement of the pedal at any point in its stroke before the full power of the actuator has been exerted, the continuing movement of the actuator will move the valve casing in the direction of the arrow Fig. 4, with respect to the valve actuating part, and seat the diaphragm on the annular seat, 11, and cut off communication between the cylinder and suction, thus locking the vacuum in the cylinder and holding the brakes as applied. The brakes may be released by releasing the pedal, so as to permit the diaphragm to seat and the disc valve to be unseated therefrom, again establishing communication between the interior of the cylinder and the atmosphere, and equalizing pressures in the actuator; permitting the brakes and actuator members to be returned to released position under the action of the brake retracting springs, as 73. It will also be understood that the physical force applied to the valve mechanism to overcome the reactionary force provided by the differential of fluid pressures will be transmitted to the lever, 30, and the brakes connected therewith, and will not be lost. When the brake mechanisms have been applied by the full force of the actuator, the operator, by further depressing the foot pedal, 88, until the lost motion between the collar, 20a, and the valve casing, is taken up, may add further physical force to the brake mechanisms, and in case of failure of power, the brake mechanisms may be applied by physical force.

In the operation of the power actuator, it will be seen that the piston moves in the direction of the arrow, $x$, in Fig. 2, while the cylinder moves in the direction of the arrow, $y$, in said figure. The piston being connected directly with the lower end of the lever, 30, will move said lever, in the direction of arrow, $x$, Fig. 2, and operate the brakes through the connected rock shafts, 75, 75$a$, and rods, 74, 74$a$, and in the construction shown, the lever, 30, is preferably provided with a plurality of apertures, 30$a$, so that the desired movement of the brake rods, 74 and 74$a$, to bring the brakes into contact and apply the full power of the actuator, may be provided. In the construction shown, the piston will move substantially twice the distance that the brake rods, 74, are moved. If we assume that the maximum movement of the brake rods is equal to one inch, the piston will therefore move two inches in applying its maximum power to the brakes. The cylinder being connected to the lower end of the main arm of lever, 31, the power amplifying arm, 34, which is directly connected to the lever, 30, in this instance at the same point as the piston, the cylinder will have to move a greater distance than the piston, determined by the proportionate lengths of the lever arms, 31 and 34. In this instance we may assume that the amplifying arm, 34, is one-fourth of the effective length of lever, 31, so that the cylinder will move four times as far as the piston, or eight inches in the direction indicated by arrow, $y$, and will, therefore, transmit to the lever, 30, at its point of connection, four times the power transmitted by the piston for any differential of fluid pressure. The stroke of the piston with respect to the cylinder is ten inches, and if it were not for the amplifying lever, 31, and its connection with the cylinder, 1, would have to be four times its present length in order to obtain the same power for the brakes from the same diameter of cylinder with the same stroke. The main arm of lever, 31, and lever, 30, may be provided with a plurality of apertures, 31$a$ and 30$a$, so that the degree of amplification of the differential of fluid pressures on the cylinder may be varied by connecting the cylinder head at different points in the arm or lever, 31. By varying the points of connection of the brake rods, 74 and 74$a$, from the pivotal axis of the rock shafts, 75 and 75$a$, to which they are respectively connected, the maximum movement of the brake rods may be adjusted, and it will be understood that the corresponding brakes at opposite sides of the vehicle will be applied. By means of these adjusting apertures, the rear wheel brakes may be applied with greater force than the front wheel brakes, or vice versa, or they may all be applied equally, as preferred.

We have, therefore, according to our invention, a pair of levers of relatively the same length, respectively supporting the relatively movable parts of the power actuator, the differential of fluid pressures on one member being applied to one lever, and the differential of fluid pressures on the other member being applied to the other lever and amplified therethrough, and transmitted through a positive connection to the first lever, so that a material increase in the power of the actuator is obtained by increasing its useful stroke, without increasing the diameter of the actuator cylinder and piston or the length of the levers beyond normal practice. The cylinder must be of sufficient length to accommodate the stroke of the piston. As the two levers are positively connected by the rod, 35, for joint operation, the brake mechanisms may be operatively connected to either of the levers, and the connection from the pedal lever, in which the valve mechanism is located, may be made to either of said levers, according to the requirements of any particular installation.

In Fig. 5, in which the parts corresponding to those in Figs. 1 to 4 are given the same reference numerals with the addition of 100, we have shown for example, a modification, in which the pedal lever is connected with the amplifying arm, 134, of the lever, 131, the valve mechanism indicated as a whole at V', being interposed in said connection. The operation of the parts will be exactly the same as hereinbefore described.

Fig. 6, in which the parts corresponding to those in Figs. 1 to 4 are given the same reference numerals with the addition of 200, we have shown the pedal lever, 288, provided with a downwardly extending projection, 288$a$, which is connected with the lever, 231, through the link rods, 278 and 279, and the relatively movable parts of the valve mechanism, indicated at V2, the other parts shown being constructed and operating in exactly the same manner as hereinbefore described. In this case the valve is operated by a pushing action instead of a pulling action, and the rod, 279, will be connected with the valve casing, while the rod, 278, will be connected with the valve actuating part.

In Fig. 4 above referred to, we have shown the valve casing members each provided with threaded portions, and the valve actuating part connected with the threaded recess at each end and extended through the valve casing, so that the valve mechanism may be connected for operation by a pull movement or a push movement, as may be desired.

In some instances, in carrying out our invention, one of the supporting levers, preferably the power applying lever, may extend upwardly from its pivotal axis, while the other lever, the power amplifying lever, extends downwardly, in which case the cylinder and piston may be supported with their axes in an inclined position, so that the cylinder will not project as far below the end of lever 31. This construction provides additional clearance between the power actuator and the roadway, where this is desirable. Thus, in Fig. 7, in which the parts corresponding to those in Fig. 1 are given the same reference numerals with the addition of 400, we have shown the lever, 430, extending upward from its pivotal support and connected with the piston rod, 405, while the lever, 431, in this instance mounted on the same pivotal axis as the pedal lever, 488, extends downwardly therefrom and is connected with the cylinder, 401. The amplifying arm, 434, is formed integral with the arm, 431, and is connected by the rod, 435, with the lever, 430, at its point of connection with the piston rod. The construction is therefore substantially the same as that shown in Figs. 1 to 3, except that the power actuator is held in an inclined position, and the cylinder does not project as far below the lever, 431, as it does in the construction shown in Figs. 2 and 4, and furthermore, the movement of the cylinder will be in an upward direction away from the roadway. In this instance the lever, 431, is provided with a third arm, 431a, extending below and on the forward side of its point of pivoting, and the pedal lever, 488, is provided with a downwardly extending projection, 488a. The valve mechanism indicated at V4, is operated by a pulling action, and in this instance the valve casing is directly connected with the arm, 488a, as indicated at 478, while the valve actuating part, 420, is connected at 479, with the projection, 431a, of lever, 431. This makes a very compact arrangement for installation in an automotive vehicle, and the operation will be exactly the same as that previously described. In this instance we have shown our invention applied to a hydraulic brake mechanism, the lever, 430, being mounted on the shaft, 475, extending through the casing or reservoir of a well known type of hydraulic pressure apparatus, indicated at 484, and operatively connected with an arm, 482, for operating a piston, 483, in a cylinder, 484, connected by pipe, 485, with the hydraulic brake cylinders for the brake mechanisms of the several wheels. This hydraulic apparatus forms no part of our present invention and will not be more particularly described.

It is to be understood as to all of the modifications of our invention herein shown and described, that the power actuator may be of the type in which the parts are pressure balanced when in the released position, or of the type in which the parts are vacuum balanced. In Figs. 1 to 6 we have illustrated a power actuator of the pressure balanced type. In Fig. 7, however, for purposes of illustration, we have shown the power actuator as being of the vacuum-balanced type. The cylinder, 401, as shown, is closed at both ends. The forward end of the cylinder is connected at all times with the suction passage of the engine by the suction pipe, 465. The rear end of the cylinder on the opposite side of the piston and through which the piston rod extends is connected also with the suction passage of the engine, through the valve mechanism, when the parts are in released position, and a power stroke of the actuator piston and cylinder is effected by admitting air through the pipe, 466, to the portion of the cylinder through which the piston rod extends, which tends to equalize pressures on that head of the cylinder, while the atmospheric pressure acts on the opposite head against the vacuum between it and the piston to move the cylinder to the right and the piston to the left.

In Fig. 8 we have illustrated one form of valve mechanism which we conveniently employ in connection with this type of actuator. The specific construction of this valve mechanism forms no part of our present invention, as it is covered by our former application for Letters Patent filed September 12, 1929, Serial No. 392,004, and it will be briefly described in order that its operation may be understood. As shown in Fig. 8, the valve mechanism comprises casing members, 406 and 406a, and clamping between them the marginal edges of a diaphragm, 407. The section, 406a, of the valve casing is provided with an annular seat, 411, to be engaged by the diaphragm, and when so engaged, this seat divides the interior of the casing into an annular suction chamber, 412, and a central chamber, 413. The suction chamber, 412, is connected by a suction pipe, 465, which is at all times in communication with the intake manifold or other source of suction. The central chamber, 413, is connected by a pipe, 466, with the actuator cylinder in rear of the piston.

420 represents the valve actuating part which has a limited movement with respect to the valve casing and is sealingly secured to the central portion of the diaphragm, 407, and is also provided with a disc valve, 410, having an annular seat, 410a, adapted to seat on the diaphragm and to hold the diaphragm unseated with respect to the seat, 411, when the parts are in released position, as shown in Fig. 8. In this instance the relative movement between the part, 420, and the valve casing is limited by collars, 427 and 428, on the valve actuating part. The casing member, 406, is provided with apertures, 418, which connect the space between the disc valve and diaphragm with the atmosphere through apertures, 419, in the diaphragm. In order to insure the proper seating of the diaphragm on the seat, 411, the diaphragm may be conveniently provided with a reinforcing plate, 407a, having apertures, 419a, therein, registering with the apertures, 419, in the diaphragm.

Within the chamber, 413, of the casing member, 406a, resistance means is provided for normally holding the disc valve seated on the diaphragm, and the diaphragm unseated. As shown, this resistance means comprises a circular series of springs, 439, interposed between the disc valve and the casing, and held in position by studs, 440, secured to a plate, 441. These springs are so calibrated as to slightly more than counterbalance the maximum differential of fluid pressures on the diaphragm and disc valve.

The valve mechanism shown in Fig. 8 is constructed to be operated either by a pulling or pushing action, and to this end, each end of the valve actuating part is provided with an interiorly threaded recess, and each of the casing members is provided with an interiorly threaded sleeve extension, as indicated at 406b and 406c. In this instance the valve is to be operated by a pulling action, and therefore the sleeve, 406c, of the casing is connected by a part, 478, with the arm, 488a, of the pedal lever, while the arm, 431a, of the lever, 431, is connected by a part, 479, with the valve actuating part, 420, as shown in Fig. 8.

The valve mechanism is shown in the released position in Fig. 8. Assuming that the engine is running and that the throttle valve is closed or partly closed, the portion of the actuator cylinder forward of the piston will be exhausted through the suction pipe 465, and the diaphragm, 407, is unseated, the portion of the cylinder in rear of the piston will likewise be exhausted through the pipe, 466, chamber, 433, vacuum chamber, 412, and the suction pipe, 465.

When the pedal lever, 488, is depressed, the arm, 488a, thereof will move the valve casing rearwardly with respect to the valve actuating part, as indicated by the arrow in Fig. 8. This will effect the seating of the diaphragm, 407, upon the seat, 411, cutting off the rear end of the cylinder from suction, after which the disc valve, 410, will be unseated from the diaphragm to connect the chamber, 413, and the rear end of the cylinder with atmosphere and initiating a power stroke of the actuator. The resistance springs, 439, offer comparatively small resistance to the seating of the diaphragm and unseating of the disc valve, as they are nearly counterbalanced by the differential of fluid pressures on the opposite faces of the diaphragm and disc valve, but as soon as the disc valve is unseated, this differential of fluid pressures gradually decreases and the force of the resistance springs is gradually transferred to the disc valve and valve actuating part, and thence to the pedal lever as a reactionary force. This reactionary force serves the purpose previously described of enabling the operator to determine the extent to which the power of the actuator is being applied to the brakes. The lost motion between the valve actuating part of the valve casing is limited by the arrangement of the disc valve with the casing member, 406a, to enable the operator to apply his physical force in the manner previously described, directly to the brakes. In other words, this valve performs the same functions with respect to the vacuum balanced cylinder and piston that the valve shown in Fig. 4 performs with respect to the pressure-balanced actuator. In the installation shown in Fig. 7 the forward movement of the pedal will operate the valve mechanism and effect the operation of the power actuator in the manner previously described with respect to Figs. 1, 2 and 3, the cylinder moving to a greater distance than the piston, and applying the force of the differential of fluid pressures thereon through the amplifying arms, 434, to the lever, 430, through which lever the power of the actuator is applied to all the brake mechanisms. The "follow-up" operation will be precisely the same as previously described with reference to Figs. 1, 2 and 3, so that the brakes can be applied in proportion to the extent of movement of the pedal lever and held in any partially applied position, by simply arresting the forward movement of the pedal, and on the release of the pedal the pressures in the actuator and valve mechanism will be equalized, permitting the brake mechanisms and piston and cylinder of the actuator to be returned to released position by the usual retracting means for the brakes.

In Fig. 9, in which the parts corresponding with those in Figs. 1, 2 and 3 are given the same reference numerals with the addition of 500, the construction is substantially the same as that shown in Fig. 7, except for the connection between the actuator and brake mechanisms, and need not be again described, and the relative positions of the cylinder and piston are reversed. In this instance the piston rod, 505, is connected with the supporting lever, 531, carrying the amplifying arm, 534, and the cylinder is connected with and supported by a crescent-shaped link, 536, which is connected with two supporting levers, 530 and 530a, one of which extends upwardly and the other downwardly, from independent rock shafts, 575 and 575b, provided respectively with arms, 576 and 576b, to which the link rods, 574a and 574, are connected, and lead respectively to the front wheel brake mechanisms and rear wheel brake mechanisms. The power amplifying arm, 534, is connected by the link rod, 535, with the crescent-shaped link, 536, and through it to both of these supporting levers, 530 and 530a. In this instance the piston has a greater movement than the cylinder, the force exerted by the differential of fluid pressures on the cylinder and piston being transmitted through the crescent-shaped link, 536, to the levers, 530 and 530a, and to the brakes through the levers, 576 and 576b, and the links, 574 and 574a. The link, 536, is provided with a plurality of apertures, indicated at 536a, for attaching the cylinder, and also the rod, 535, at different points therein, to distribute the power as desired to the various brake mechanisms. In this construction the piston and cylinder of the actuator are not shown connected to a common point, as shown in the other figures.

Fig. 10, in which the parts corresponding with those shown in Figs. 1 to 4 are given the same numerals with the addition of 600, illustrates an installation similar to that shown in Fig. 8, except that the lever, 631, is pivoted at 633, to a projection, 688b, instead of being mounted coaxially with the pedal lever, and the pedal lever is provided with a downwardly extending arm, 688a, for operating the valve mechanism, V6, of the type shown in Fig. 8, by a pushing action instead of a pulling action, the valve casing being connected to the extension, 688a, to the pedal lever, and the valve actuating part being connected in this instance to the supporting lever, 631, to the lower end of which the cylinder, 601, of the vacuum balanced actuator is connected. The piston rod, 605, is connected to the supporting lever, 630, mounted in this instance on the rock shaft, 675, of a hydraulic pressure apparatus, 681, of the type previously described with reference to Fig. 8, for operating hydraulic brake systems in a well known manner. The connecting rod, 635, extends from the upper end of the amplifying arm, 634, to a point in a second lever, 630a, secured to the rock shaft, 675, the point of connection between the rod, 635, and the lever, 630a, being in substantial alignment with the axis of the piston and cylinder, as shown, and forming the positive connection between the lever, 630, and the lever, 631. While the lever, 631, is mounted on the pedal lever eccentrically to its pivotal axis, the location of the pivotal connection, 633, is such that the operation of the power actuator will not offer any material resistance or reaction to the movement of the foot pedal. The operation of the parts will be substantially identical with that previously described with reference to Fig. 7.

In Fig. 11, in which the parts corresponding with those shown in Figs. 1 to 4 are given the same reference numerals with the addition of 700, we have illustrated another modification of our invention in which the supporting lever, 731, is mounted concentrically with the pedal lever, 788, but movable with respect thereto, and extends in an upward direction, while the lever, 730, extends downwardly from its point of pivoting and is provided with an upwardly extending power amplifying arm, 734. The cylinder, 701, of the actuator is shown connected to and supported by the lever 730, while the piston rod, 705, is connected with the lever, 731. The power amplifying arm, 734, is connected by the link rod, 735, with the lever, 731, and said lever, 731, is provided in this instance with an auxiliary arm, 731a, connected with a piston rod, 783a, of a pressure piston, 783, in a hydraulic pressure cylinder, 784, of the barrel type, having a pipe, 785, which is connected to the hydraulic cylinders for operating the several brake mechanisms in the well known manner common to hydraulic brake apparatus. In this instance the valve mechanism, V7, is operated by a pushing action, as in Fig. 10, and is interposed between the pedal lever, 788, and the arm, 731a, of the lever 731. The operation of the parts will be substantially as hereinbefore described, and need not be repeated.

It will be understood that while we have shown a variety of embodiments of our invention herein, the details of construction may be further varied to meet the requirements of particular automotive vehicles, without departing from our invention.

What we claim and desire to secure by Letters Patent is:—

1. In a brake system for automotive vehicles, the combination with a power actuator comprising members movable with respect to each other and to the vehicle, a plurality of pivotally mounted levers, one of said levers being connected with each of said relatively movable actuator members, and supporting said actuator, said actuator forming a variable connection between said levers, one of said levers being provided with a power amplifying arm positively connected with the other of said levers, brake mechanisms operatively connected with certain of said levers, controlling valve mechanism for the actuator, and a physically operable part connected with said valve mechanism.

2. In a brake system for automotive vehicles, the combination with a power actuator comprising members movable with respect to each other and to the vehicle, a plurality of pivotally mounted levers, one of said levers being connected with each of said relatively movable actuator members, and supporting said actuator, said actuator forming a variable connection between said levers, one of said levers being provided with a power amplifying arm positively connected with the other of said levers, brake mechanisms operatively connected with certain of said levers, controlling valve mechanism for the actuator, and a physically operable part connected with said valve mechanism, and operatively connected with one of said levers by means providing lost motion to insure the operation of said valve mechanism.

3. In a brake system for automotive vehicles, the combination with a power actuator comprising members movable with respect to each other and to the vehicle, a plurality of pivotally mounted levers, one of said levers being connected with each of said relatively movable actuator members, and supporting said actuator, said actuator forming a variable connection between said levers, one of said levers being provided with a power amplifying arm positively connected with the other of said levers, brake mechanisms operatively connected with certain of said levers, controlling valve mechanism for the actuator, and a physically operable part for operating said valve mechanism connected with one of said levers by means providing lost motion, and means for limiting said lost motion to enable the operator to transmit physical force to both of said levers, and to the said brake mechanism.

4. In a brake system for automotive vehicles, the combination with a fluid pressure operated power actuator comprising two members movable in opposite directions with respect to each other and both movable with respect to the vehicle, a lever pivoted to the vehicle and to one of said members, a second lever separately pivoted to the vehicle and to the other of said members, one of said levers having a power amplifying arm extending on the opposite side of its point of pivoting and connected positively with the other lever, connections from certain of said levers to brake mechanisms of the vehicle, controlling valve mechanism for said actuator, and a physically operable part connected with said valve mechanism.

5. In a brake system for automotive vehicles, the combination with a fluid pressure operated power actuator comprising two members movable in opposite direction with respect to each other and both movable with respect to the vehicle, a lever pivoted to the vehicle and to one of said members, a second lever separately pivoted to the vehicle and to the other of said members, one of said levers having a power amplifying arm extending on the opposite side of its point of pivoting and connected positively with the other lever, connections from certain of said levers to brake mechanisms of the vehicle, controlling valve mechanism for said actuator comprising relatively movable parts having a limited relative movement, a physically operable part, and connections including said relatively movable parts of said valve mechanism from said physically operable part to one of said levers.

6. In a brake system for automotive vehicles, the combination with a fluid pressure operated power actuator, comprising two members movable in opposite directions with respect to each other and both movable with respect to the vehicle, a pair of supporting levers, each pivoted to the vehicle and to one of said actuator members and supporting the actuator, one of said levers having a power amplifying arm unyieldingly connected with the other lever adjacent to its connection with the actuator member, connections from certain of said levers to brake mechanisms, a controlling valve mechanism for said actuator, and a physically operable part connected with said valve mechanism.

7. In a brake system for automotive vehicles, the combination with a fluid pressure operated power actuator, comprising two members movable in opposite directions with respect to each other and both movable with respect to the vehicle, a pair of supporting levers, each pivoted to the vehicle and to one of said actuator members and supporting the actuator, one of said levers having a power amplifying arm unyieldingly connected with the other lever adjacent to its connection with the actuator member, connections from certain of said levers to brake mechanisms, a controlling valve mechanism for said actuator provided with relatively movable parts having a limited relative movement, said relatively movable parts of the valve mechanism being interposed in connections between a part connected with said physically operable part, and a part connected with one of said levers.

8. In a brake system for automotive vehicles, the combination with a fluid pressure operated power actuator comprising two members movable in opposite directions with respect to each other, and both movable with respect to the vehicle, a pair of supporting levers each pivoted to the vehicle and to one of said actuator members, one of said levers extending downwardly and the other upwardly from its pivotal connection with the vehicle, said levers supporting the power actuator with its axis in an inclined position, one of said levers having a power amplifying arm unyieldingly connected with the other lever adjacent to the connection of the latter with the actuator member with which it is connected, connections from certain of said levers to brake mechanisms, and controlling valve mechanism for said actuator, and a physically operable part connected with said valve mechanism and operatively connected by means providing lost motion with one of said levers.

9. In a brake system for automotive vehicles, the combination with a fluid pressure operated power actuator comprising two members movable in opposite directions with respect to each other, and both movable with respect to the vehicle, a pair of supporting levers each pivoted to the vehicle and to one of said actuator members, one of said levers extending downwardly and the other upwardly from its pivotal connection with the vehicle, said levers supporting the power actuator with its axis in an inclined position, one of said levers having a power amplifying arm unyieldingly connected with the other lever adjacent to the connection of the latter with the actuator member with which it is connected, connections from certain of said levers to brake mechanisms, and controlling valve mechanism for said actuator, comprising relatively movable parts having a limited movement with respect to each other, a physically operable part connected with one of the relatively movable parts of the valve mechanism, and a connection from the other of said relatively movable parts of the valve mechanism to one of said levers.

10. In a brake system for automotive vehicles, the combination with a fluid pressure operated power actuator, comprising two members movable in opposite directions with respect to each other and both movable with respect to the vehicle, a pair of supporting levers, each pivoted to the vehicle and to one of said actuator members and supporting the actuator, one of said levers having a power amplifying arm unyieldingly connected with the other lever adjacent to its connection with the actuator member, connections from certain of said levers to brake mechanisms, a controlling valve mechanism for said actuator comprising relatively movable parts having a limited movement with respect to each other, a physically operable part pivotally connected with the vehicle coaxially with one of said levers, one of the relatively movable parts of the valve mechanism being connected with the physically operable part, and the other of the said relatively movable parts of the valve mechanism being connected with said coaxially mounted lever.

11. In a brake system for automotive vehicles, the combination with a fluid pressure operated power actuator, comprising two members movable in opposite directions with respect to each other and both movable with respect to the vehicle, a pair of supporting levers, each pivoted to the vehicle and to one of said actuator members and supporting the actuator, one of said levers having a power amplifying arm unyieldingly connected with the other lever adjacent to its connection with the actuator member, connections from certain of said levers to brake mechanisms, a controlling valve mechanism for said actuator provided with relatively movable parts having a limited movement with respect to each other, a physically operable part mounted coaxially with one of said levers, the said physically operable part and said coaxially mounted lever being each provided with an arm depending below their common pivotal axis, one of said arms being connected with one of the relatively movable parts of said valve mechanism, and the other of said relatively movable parts of the valve mechanism being connected to the other of said arms.

12. In a brake system for automotive vehicles, the combination with a fluid pressure operated power actuator, comprising two members movable in opposite directions with respect to each other and both movable with respect to the vehicle, a pair of supporting levers, each pivoted to the vehicle and to one of said actuator members and supporting the actuator, one of said levers having a power amplifying arm unyieldingly connected with the other lever adjacent to its connection with the actuator member, connections from certain of said levers to brake mechanisms, a controlling valve mechanism for said actuator provided with relatively movable parts having a limited movement with respect to each other, a physically operable part for operating said valve mechanism, certain of said parts of the valve mechanism being subjected during a power stroke of the actuator to the differentials of fluid pressures corresponding with those to which the actuator members are subjected, and acting in a direction to oppose the movement of the physically operable part.

13. In a brake system for automotive vehicles, the combination with a fluid pressure operated power actuator, comprising two members movable in opposite directions with respect to each other and both movable with respect to the vehicle, a pair of supporting levers, each pivoted to the vehicle and to one of said actuator members and supporting the actuator, one of said levers having a power amplifying arm unyieldingly connected with the other lever adjacent to its connection with the actuator member, connections from certain of said levers to brake mechanisms, a controlling valve mechanism for said actuator provided with relatively movable parts having a limited relative movement, said relatively movably parts of the valve mechanism being interposed in connections between a part connected with said physically operable part, and a part connected with one of said levers, certain of the relatively movable parts of said valve mechanism being subjected during a power stroke of the actuator to differentials of fluid pressures corresponding with those to which the actuator members are subjected, and acting in a direction to oppose the movement of the physically operable part.

In testimony whereof we affix our signatures.

CALEB S. BRAGG.
VICTOR W. KLIESRATH.